United States Patent [19]

Lindberg

[11] Patent Number: 4,795,290
[45] Date of Patent: Jan. 3, 1989

[54] DRILL WITH SECONDARY CUTTER

[75] Inventor: Hans E. Lindberg, Sandviken, Sweden

[73] Assignee: Sandvik AB, Sandviken, Sweden

[21] Appl. No.: 55,153

[22] Filed: May 28, 1987

[30] Foreign Application Priority Data

Jun. 3, 1986 [SE] Sweden .................................. 8602499

[51] Int. Cl.⁴ ............................................. B23B 51/10
[52] U.S. Cl. ...................................... 408/224; 407/49; 407/104; 408/232
[58] Field of Search ........ 408/199, 200, 223, 224–232, 408/713; 407/49, 104, 108

[56] References Cited

U.S. PATENT DOCUMENTS

| | | | |
|---|---|---|---|
| 1,332,736 | 3/1920 | McQueston | 407/49 X |
| 1,461,548 | 7/1923 | West | 408/226 X |
| 3,940,214 | 2/1976 | Waschek | 408/26 |
| 4,343,577 | 8/1982 | Purdon | 408/226 X |

FOREIGN PATENT DOCUMENTS

| | | |
|---|---|---|
| 447074 | 10/1986 | Sweden . |
| 523733 | 7/1972 | Switzerland . |
| 2092033 | 8/1982 | United Kingdom . |

*Primary Examiner*—Gil Weidenfeld
*Assistant Examiner*—Steven C. Bishop
*Attorney, Agent, or Firm*—Burns, Doane, Swecker & Mathis

[57] ABSTRACT

A drill provided with means for effecting a secondary cutting function, such as chamfering, counterboring and/or countersinking. The drill (10) comprises chip flutes, lands (14) and a cutting tip (11). Said means comprise a cylindrical tooth (12) provided with a cutting edge (13) and a pin (17). The land (14) is provided with two holes (15,18) which receive the tooth and the pin.

10 Claims, 1 Drawing Sheet

U.S. Patent    Jan. 3, 1989    4,795,290
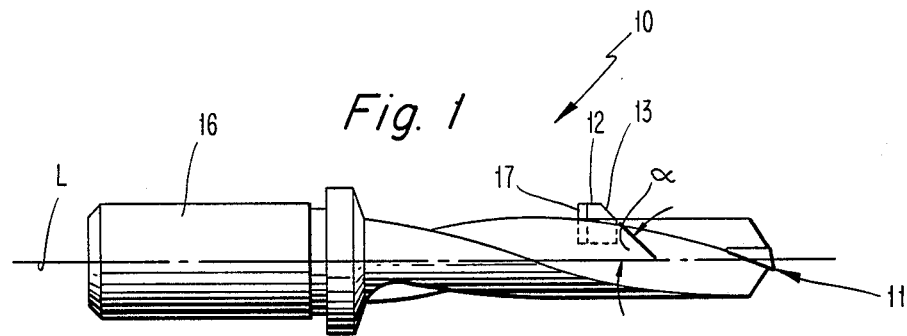
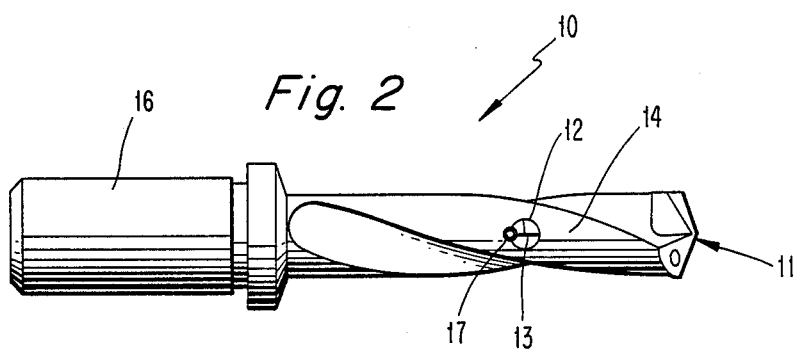
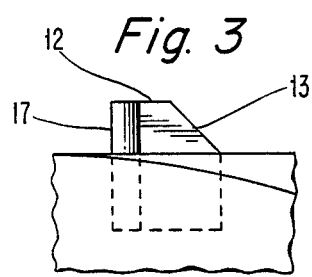
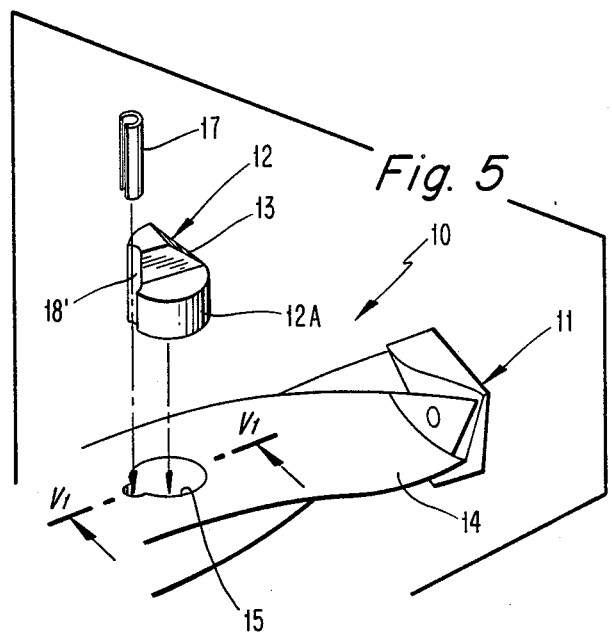
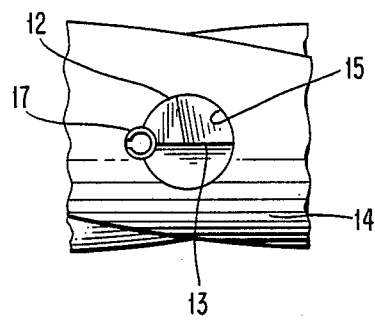
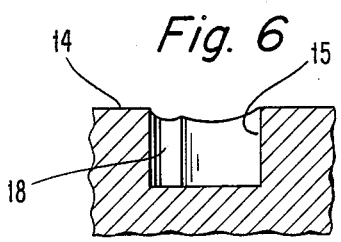

DRILL WITH SECONDARY CUTTER

This invention relates to a drill, more particularly to a drill provided with means for effecting a secondary function, e.g., chamfering, counterboring and/or countersinking.

It is previously known to form a twist drill having a secondary cutter in the form of a fixed tooth remote from a cutting tip of the drill, said tooth having a cutting edge projecting radially beyond a land of the twist drill. The disadvantages of this drill are that the tooth is not easily exchangeable and that the recess for the tooth weakens the drill body.

The object of the present invention is to provide a drill with means for effecting a secondary function in a reliable and inexpensive manner, yet capable of being easily exchangeable and being rigidly secured.

THE DRAWINGS

The invention will be more clearly described hereinafter in connection with the appended drawings wherein FIG. 1 shows an elevation view of a drill in accordance with the invention.

FIG. 2 shows a plan view of FIG. 1.

FIGS. 3 and 4 show parts of the drill in a side view and a plan view, respectively.

FIG. 5 shows the drill in an exploded view.

FIG. 6 shows a cross-section of a part of the drill according to the line VI—VI in FIG. 5.

DESCRIPTION OF A PREFERRED EMBODIMENT OF THE INVENTION

In the figures a twist drill 10 is provided remote from its cutting tip 11 with a tooth 12 having a cutting edge 13 projecting radially beyond one land 14 of the drill. The tooth 12 includes a mounting portion having a cylindrical outer surface 12A. The tooth is disposed within a mainly cylindrical recess 15 in the middle of the land 14 anywhere along the land, depending on the desired hole depth. A mounting shank 16 is arranged at the other end of the drill, opposite to the cutting tip 11. The lands 14 are bordered by straight or screw-shaped chip flutes. Alternatively the drill may be provided with two opposite teeth. The tooth 12 is secured into the recess 15 by means of a slotted tube or resilient pin 17 which cooperates with an at least semi-cylindrical recess 18 in the drill. The recess 18 and the recess 15 are directed mainly perpendicularly to the longitudinal center axis L of the drill and overlap one another.

The tooth 12 has a cutting edge 13 which extends backwards and outwards forming an acute angle $\alpha$ with the center axis CL of the drill 10. The angle $\alpha$ is between 30 to 65 degrees.

The tooth 12 has a groove 18' which together with the recess 18 in the land form a cylindrical hole to receive the pin 17. The recess 18 constitutes the major part (more than 180°) of the circumference of the formed cylindrical hole. The radius of the groove 18' is 0.4 to 0.7 times the radius of the tooth 12. The groove 18' occupies less than 180° of the outer surface 12A, whereby the latter extends for more than 180°. The groove is generally parallel to the axis of the tooth. The center of the groove radius lies on the outer surface of the tooth. The groove faces away from the cutting tip 11.

The radii of the hole 18 and the groove 18' are equal. The hole formed therefrom has a less diameter than the pin 17, such that the latter will wedge into said hole when it is inserted therein.

The pin 17 will hold the tooth 12 and prevent it from being cast out during rotation of the drill. When the tooth engages the work piece, the cutting forces will have a force component which presses the tooth into the recess 15. Furthermore, the pin 17 guides the tooth 12 and prevents it from being rotated relative to the land 14 during the counterboring or countersinking.

Alternatively the hole formed by elements 18, 18' may be adapted for a conical pin.

To release the tooth the pin is removed by a tool, such as a pair of pliers, whereafter the tooth may be picked out of the recess 15.

Thus, the present invention relates to a drill provided with means for effecting a secondary function. The shape of said means provides for an unobstructed flow of chips, a rigid drill and a simple exchange operation.

I claim:

1. A drill comprising:
   a drill body defining a longitudinal axis of rotation and including:
   a front cutting tip,
   lands extending rearwardly from said cutting tip to form chip flutes,
   a mounting shank at a rear end of said body,
   a first recess formed in one of said lands at a location spaced longitudinally rearwardly of said cutting tip, said first recess being cylindrical and extending radially relative to said longitudinal axis, and
   a second recess formed in said one land extending substantially radially of said longitudinal axis in overlapping relationship to said first recess,
   a removable cutting tooth for making a secondary cut, said cutting tooth comprising:
   a mounting portion having a cylindrical outer surface disposed in said first recess,
   a cutting edge disposed radially beyond said first recess for making a secondary cut, and
   a longitudinal groove formed in said outer surface of said tooth, said groove facing said second recess to form therewith a hole, said groove occupying substantially less than 180 degrees of said outer surface such that said outer suface extends substantially more than 180 degrees, and
   a retaining pin disposed in said hole and exerting clamping forces against said tooth for pressing said outer surface against a wall of said first recess to resist removal of said tooth from said first recess, a radially outer end of said pin projecting from said hole to be accessible for being gripped by a pin-removal tool.

2. A drill according to claim 1, wherein said hole is cylindrical and said pin is cylindrical and radially resilient.

3. A drill according to claim 2, wherein a diameter of said pin when said pin is in a relaxed state is larger than a diameter of said hole, said pin being radially compressed when disposed in said hole.

4. A drill according to claim 1, wherein said first and second recesses extend perpendicularly relative to said axis.

5. A drill according to claim 1, wherein said groove comprises a segment of a circle having a radius which is from 0.4 to 0.7 times a radius of said mounting portion, a center of said circle lying on said outer surface, said groove opening longitudinally in a direction away from said cutting tip.

6. A drill according to claim 2, wherein radii of said second recess and said groove are of equal length.

7. A drill according to claim 1, wherein said cutting edge is inclined longitudinally rearwardly and radially outwardly and forms an acute angle with said axis.

8. A drill according to claim 7, wherein said angle is from 30 to 65 degrees.

9. A drill according to claim 1, wherein said hole and pin are each of conical shape.

10. A tooth adapted to be inserted in a cylindrical recess of a drill rearwardly of a front end of the drill for making a secondary cut, said tooth comprising a mounting portion having a cylindrical outer surface defining a longitudinal tooth axis and including a surface at one longitudinal end of said tooth for limiting the extent of insertion of said tooth into a drill, a cutting edge disposed adjacent an opposite end of said tooth and forming an acute angle with said tooth axis, a longitudinally extending groove formed in said outer surface, said groove occupying substantially less than 180 degrees of said outer surface such that said outer surface extends substantially more than 180 degrees.

* * * * *